US008990847B2

(12) United States Patent
Aldrey et al.

(10) Patent No.: US 8,990,847 B2
(45) Date of Patent: Mar. 24, 2015

(54) METHOD, COMPUTER PROGRAM PRODUCT, AND APPARATUS FOR DELIVERING INFORMATION AND COMMANDS REGARDING A MEDIA PROGRAM

(75) Inventors: Raul Aldrey, Dallas, TX (US); Harpal Bassali, Waltham, MA (US); Marcelo Lechner, Burlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1680 days.

(21) Appl. No.: 11/935,145

(22) Filed: Nov. 5, 2007

(65) Prior Publication Data

US 2009/0119701 A1    May 7, 2009

(51) Int. Cl.
| | |
|---|---|
| *H04N 7/08* | (2006.01) |
| *G06F 3/01* | (2006.01) |
| *G06F 13/00* | (2006.01) |
| *H04N 7/173* | (2011.01) |
| *H04N 5/76* | (2006.01) |
| *H04N 21/235* | (2011.01) |
| *H04N 21/258* | (2011.01) |
| *H04N 21/433* | (2011.01) |
| *H04N 21/435* | (2011.01) |
| *H04N 21/458* | (2011.01) |
| *H04N 21/462* | (2011.01) |
| *H04N 21/472* | (2011.01) |
| *H04N 21/4722* | (2011.01) |
| *H04N 21/4725* | (2011.01) |
| *H04N 21/4728* | (2011.01) |
| *H04N 21/81* | (2011.01) |
| *H04N 5/765* | (2006.01) |
| *H04N 9/82* | (2006.01) |

(52) U.S. Cl.
CPC ............. *H04N 5/76* (2013.01); *H04N 7/17318* (2013.01); *H04N 21/235* (2013.01); *H04N 21/25875* (2013.01); *H04N 21/4334* (2013.01); *H04N 21/435* (2013.01); *H04N 21/4583* (2013.01); *H04N 21/4622* (2013.01); *H04N 21/47202* (2013.01); *H04N 21/47214* (2013.01); *H04N 21/4722* (2013.01); *H04N 21/4725* (2013.01); *H04N 21/4728* (2013.01); *H04N 21/812* (2013.01); *H04N 5/765* (2013.01); *H04N 9/8205* (2013.01)
USPC .................. 725/32; 725/37; 725/42; 725/112

(58) Field of Classification Search
CPC ............ H04N 21/4334; H04N 21/812; H04N 21/4126
USPC .................................. 725/37–43, 58, 61, 112
See application file for complete search history.

(56) References Cited

U.S. PATENT DOCUMENTS 7,003,791 B2 * 2/2006 Mizutani ......................... 725/21
7,143,430 B1 * 11/2006 Fingerman et al. ............. 725/87

(Continued)

*Primary Examiner* — Benjamin R Bruckart
*Assistant Examiner* — Jason Thomas (57) ABSTRACT

A method, a computer program product, and apparatus are provided for delivering information and commands regarding a media program. An advertisement is provided that allows a user to request more information about the media program by clicking on or otherwise selecting the advertisement. The information may be based on the identity of the user. The information may include programming guide information regarding the media program that is available to an associated set top box of the user. The user may also be able to send commands, such as record the media program or set up a reminder about the media program, through a DVR scheduling facility to the set top box. The set top box may be able to send an acceptance of the command or a notice of conflict to the user through the DVR scheduling facility.

20 Claims, 9 Drawing Sheets

(56) References Cited

U.S. PATENT DOCUMENTS

| | | | |
|---|---|---|---|
| 2003/0149988 A1* | 8/2003 | Ellis et al. | 725/87 |
| 2006/0026067 A1* | 2/2006 | Nicholas et al. | 705/14 |
| 2006/0026645 A1* | 2/2006 | Milnes et al. | 725/46 |
| 2007/0220554 A1* | 9/2007 | Barton et al. | 725/46 |
| 2007/0300263 A1* | 12/2007 | Barton et al. | 725/60 |
| 2008/0212941 A1* | 9/2008 | Lillethun et al. | 386/124 |

* cited by examiner

METHOD, COMPUTER PROGRAM PRODUCT, AND APPARATUS FOR DELIVERING INFORMATION AND COMMANDS REGARDING A MEDIA PROGRAM

BACKGROUND INFORMATION

Digital video recorders are common devices used to record and replay media programs. However, at times, a user may be away from his or her digital video recorder when the user wants to record a particular media program. For example, the user may see an advertisement for a particular media program. But at the time the user sees the advertisement, the user may be away from the digital video recorder, e.g., the advertisement may appear on a web page viewed on a mobile device, and not be able to configure the digital video recorder to record the show. By the time the user is near the digital video recorder, he or she may not remember to record the media program that was the subject of the advertisement, may not be able to find the media program in the user's video service or the media program may have already aired.

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Figure 1:
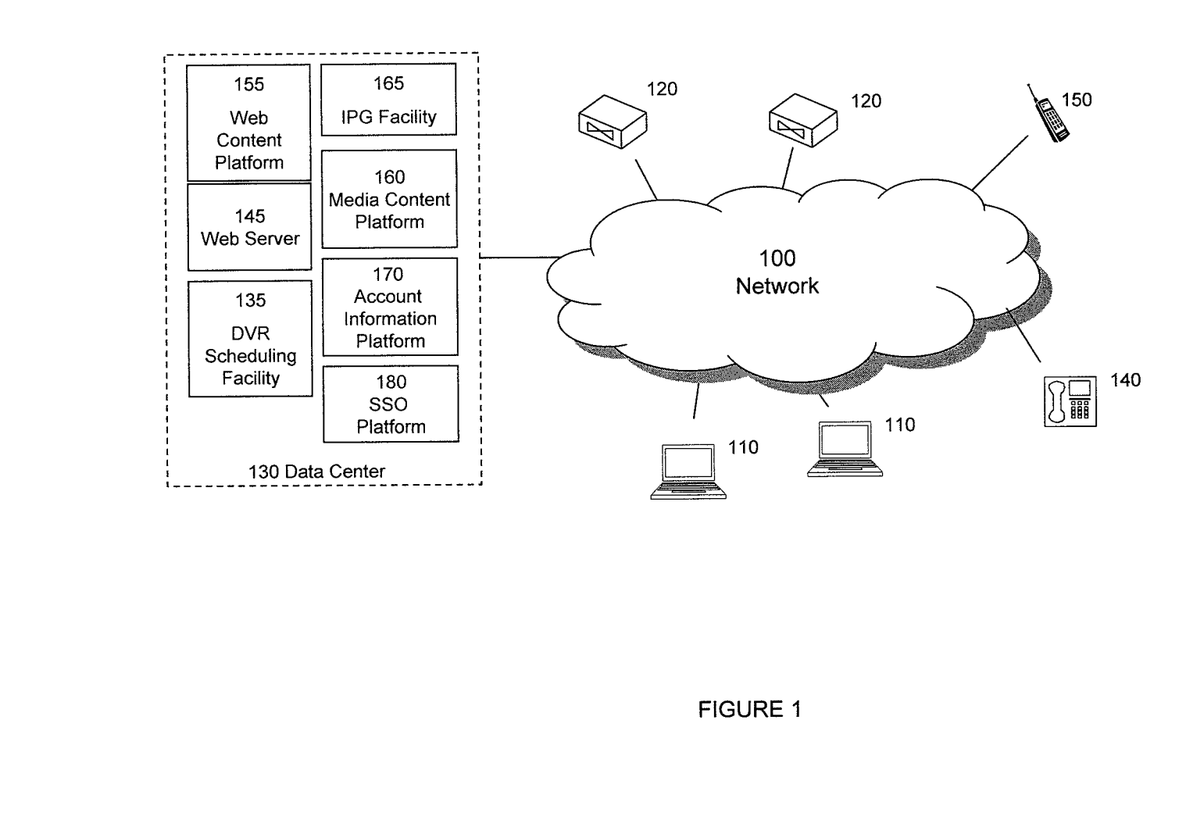
FIG. 1 is a block diagram of a data network consistent with exemplary embodiments.

Preferred embodiments described herein relate to apparatuses, methods, and computer program products for delivering information and commands regarding a digital video recorder. FIG. 1 illustrates a network 100 consistent with an exemplary embodiment. As shown, various peripheral and communication devices may be in communication with each other through the network 100. The network 100 may include any number of interconnected physical/logical networks, including a Wide Area Network ("WAN"), a Local Area Network ("LAN"), an intranet and/or the Internet. As a more specific example, at least part of the network may be part of a fiber optic network, such as fiber-to-the-home ("FTTH"), fiber-to-the-premises ("FTTP"), fiber-to-the-curb ("FTTC"), fiber-to-the-X ("FTTX"), hybrid fiber coax ("HFC") and other fiber optic networks of one or more media and telephone service providers configured to deliver services to a number of users or subscribers. In some embodiments, at least part of the network 100 may include a wireless network, such as a direct satellite broadcast network or a terrestrial wireless network. At least a portion of network 100 may be provided by a network provider that provides network access services to end users/subscribers, as well as other services (e.g., video services).

An example of a communication device is a set top box 120. The set top box 120 may be configured to receive one or more signals representing a media program from an external source and convert the signals for display of the media program on a television (not illustrated) that is in communication with the set top box. As an example and as illustrated, the external source may be one or more data centers 130 in communication with the network 100. The data center 130 may include one or more media content platforms 160. The media content platforms 160 provide at least some of the storage and/or processing functions for a media provider and/or network provider to deliver the media programs to the set top boxes 120 and/or other communication devices connected to the network 100.

The communication devices connected to the network 100 may also include traditional computer devices 110, such as desktops and laptops, and have various communication programming applications including, for example, email and a "Web" browser. Other communication devices connected to the network may include, but are not limited to, telephone devices, such as landline phones 140 and wireless mobile devices 150. Although the data center 130 and the communication devices 110, 120, 140, 150 are shown with direct connections to the network 100, any number and type of network elements may be interposed between the data center 130, the communication devices 110, 120, 140, 150, and the network 100

Figure 2:
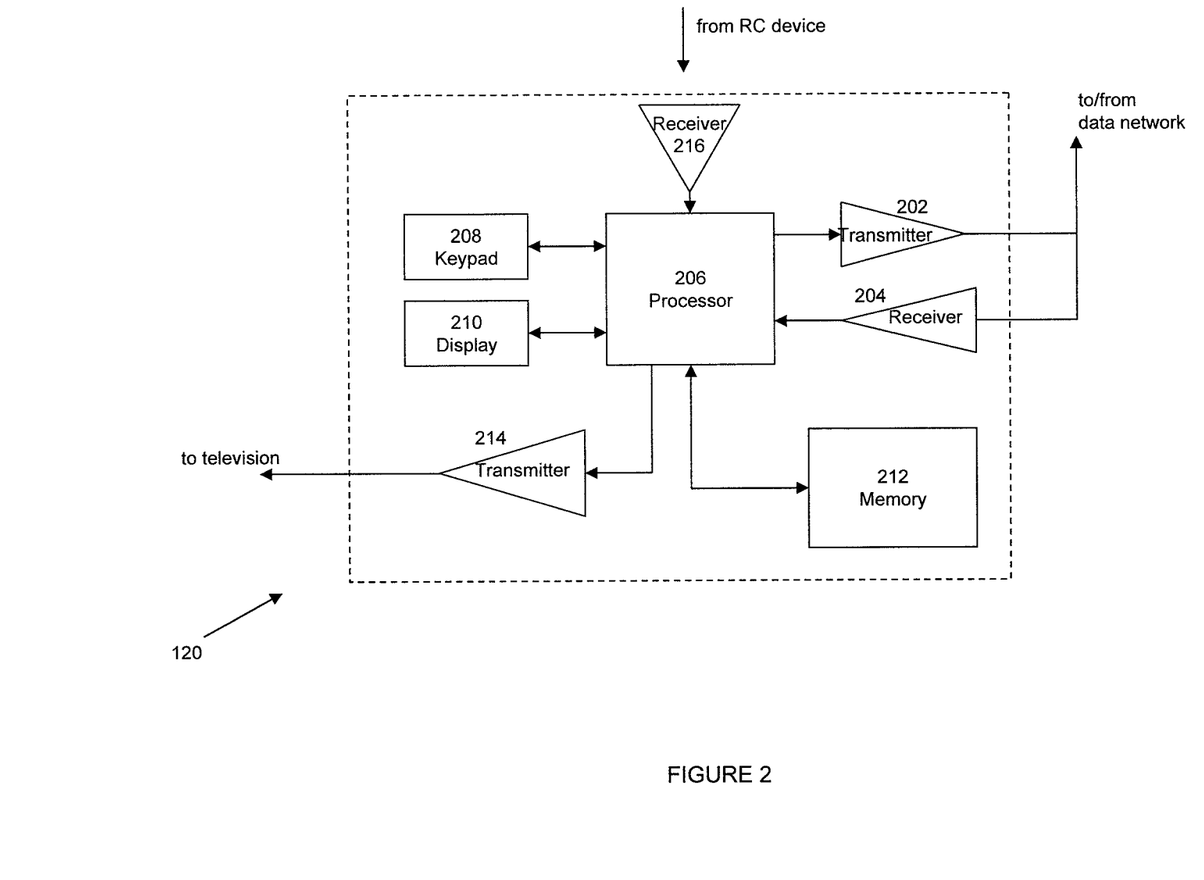
FIG. 2 is a block diagram of a set top box consistent with exemplary embodiments.

One example of a set top box 120 is illustrated in FIG. 2. As shown in FIG. 2, the set top box 120 may include a first transmitter 202, a first receiver 204, a processor 206, a user interface such as a keypad 208, a display 210, at least a first memory element 212, a second transmitter 214, and a second receiver 216. The first receiver 204 is configured to receive the media program from the external source through the network 100. For example, the set top box 120 may include an adapter or port for receiving a fiber optic cable or a coaxial cable (in the case of wired connection to the network 100) or a wireless connection to network 100 via an antenna. The external source may be a data center, for example, a media content platform of a media provider that is communicatively coupled to the set top box 120 through the network 100.

The processor 206 may comprise one or more processing devices, such as microprocessors, digital signal processors, logic devices or other known processing devices. The processor 206 may be configured to provide processing and command functions, which may include translation or conversion of the received signals into an output suitable for display on the television. The processor 206 may also be configured to send the media program through the second transmitter 214 of the set top box 120 to the television. Although not illustrated, the set top box 120 may have a third transmitter and the processor 206 may be configured to process the received signals into two outputs, e.g., a video output sent through the second transmitter for display on the television and a sound output sent through the third transmitter to a sound system either integrated with the television or a stand alone system.

The display 210 of the set top box may include information such a clock and/or the current channel for the television, and/or indicators on whether or not the set top box is powered on and/or whether it is recording. In instances in which the user interface includes a keypad, the keypad 208 may include one or more buttons to allow a user to enter commands and selections into the set top box 120. The second receiver 216 may be configured to receive radio signals from a remote control device (not illustrated) as another method of receiving commands and selections from a user.

The processor 206 may also be configured to send a request through the first transmitter 202 to the media provider for a particular media program or programs, or otherwise control the first receiver to obtain a particular media program (e.g., through tuning to particular frequencies or ports) based on commands and selections from the user. The media program may include a "linear" media program or a video on demand ("VOD") asset. The processor 206 may also cause the set top box to record the requested media program into the memory element 212 based on commands and selections from the user (e.g., the set top box may include a digital video recorder ("DVR") facility, or be in communication with a separate DVR facility, such as an attached device or a network-based DVR facility). For example, the user may request for a future program to be recorded. At the scheduled time for the media program, the processor 206 may request the corresponding signals for the media program, also referred to herein as media programming signals, and store the media programming signals into the memory element 212. The stored or recorded media program is viewable to the user upon request. In particular, the processor 206 may retrieve a recorded program from the memory element 212 and send it to the television to be viewed by the user upon request from the user. The memory element 212 may also maintain programming instructions, i.e., software, pertaining to the functions and operability of the set top box.

The set top box 120 may also be configured to receive signals that represent an interactive programming guide ("IPG") for the user. In particular, in some embodiments, upon request from the user, the processor 206 sends a request to the network provider for the signals that provide the IPG or a portion thereof (e.g., program guide data). In response to the request, the network provider sends the IPG or portion thereof to the set top box. The set top box 120 may also store at least some of the signals that represent the IPG. For example, according to an alternate embodiment, the set top box 120 may periodically (e.g., every day, every time the set top box is powered on) receive and store signals for the IPG from the network provider without receiving a particular request from the user. With the stored IPG, the set top box may send the stored IPG to the television for display to the user without receiving additional signals from the network provider at the time of the request from the user. The stored IPG may contain program guide information for media programs accessible via the available channels for a predetermined amount of days or hours (e.g., 14 days). The IPG may be customer specific, e.g., the network provider may send an IPG that corresponds to an account of the user, which may take into consideration the channels available to the user based on the location of the set top box and the subscription of the user, e.g., a basic channel package or a channel package with premium channels.

The processor 206 may send the IPG to the television for display thereon and interaction with the user. The IPG may display a listing of channels, times, and/or programming, and the user may browse through the listing through either the keypad 208 or remote control device. In general, the IPG provides a graphic user interface ("GUI") for the user and, through this GUI, the user may be able to select programs to watch or to be recorded, call up recorded programs, and/or order videos on demand. The processor 206 may either execute the selections or store them within the memory element 212 for future execution.

The set top box 120 may be a stand alone device or be integrated within the television. Moreover, a television as used herein may be any monitor capable of displaying the media content from the set top box. For example, a television may be a LCD display, plasma display, projection display, CRT monitor or other video display.

Figure 3:
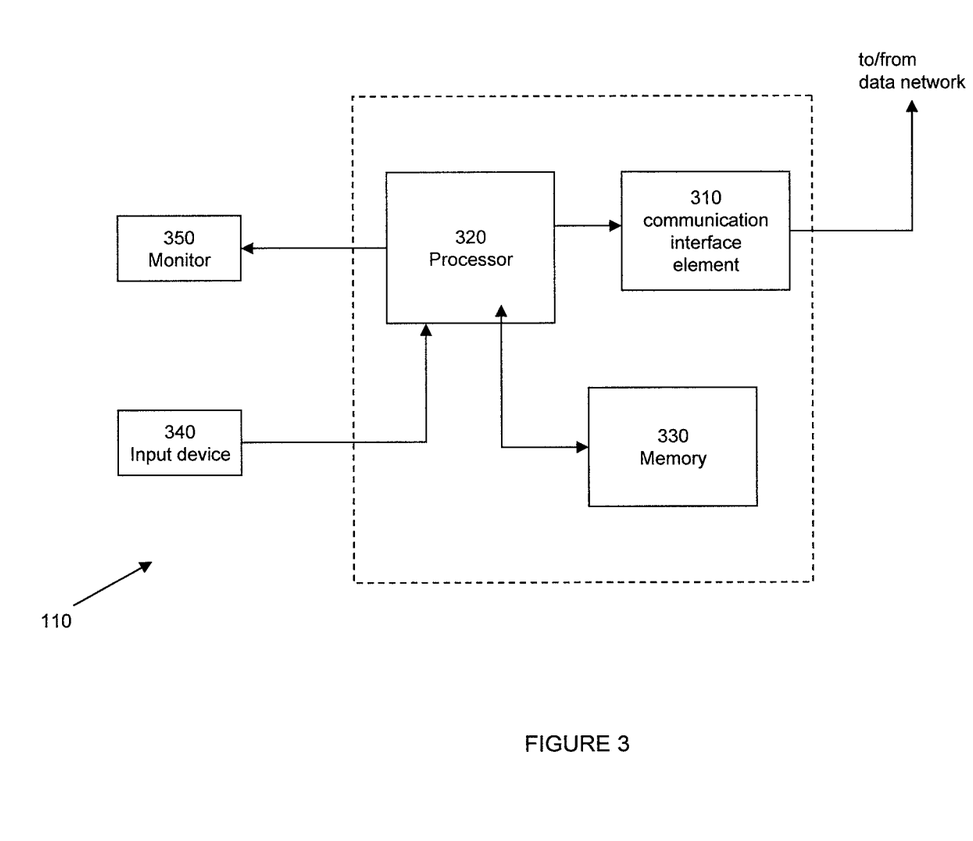
FIG. 3 is a block diagram of a computer device consistent with exemplary embodiments.

As shown in FIG. 3, an example of a computer device 110 connected to the network 100 may include a communication interface element 310 (e.g., a receiver element and a transmitter element), a processor 320, a memory element 330, an associated user input device 340, and an associated monitor 350. This example of components included within a computer device 110 may be equally applicable to all or portions of set top box 120, landline telephone 140 and mobile devices 150, or other communication devices, as is well known.

The communication interface element 310 (e.g., a wired or wireless network interface card ("NIC") or a modem) is configured to send and receive data via the network 100, permitting for communication with, for example, other communication devices 110, 120, 140, 150 or the data center 130 connected to the network 100.

The processor 320 of the computer device may be configured to provide processing and command functions, which may include translation or conversion of data received through the network 100 or between associated software applications of the computer device 110. The processor 320 may be able to send signals suitable for display on an associated monitor 350 based on data received through the network, based on commands and responses of a user, or in accordance with the associated software applications of the computer device. The memory element 330 may maintain at least some of the programming instructions pertaining to the functions and operability of the computer device 110.

The computer device 110 may have one or more associated user input devices 340. A user input device 340 may be integrated into the computer device 110 or be a peripheral device in communication with the computer device 110. In general, a user input device 340 is configured to allow a user to enter commands or selections into the computer device 110. For example, the user input device 340 may be a mouse, a keyboard, a touch screen mechanism, or an audio or video sensor.

As stated above, the computer device 110 may have various communication software applications, including but not limited to a web browser. In general, the web browser provides the programming instructions for the processor 320 to deliver a graphical user interface ("GUI") on the monitor to allow the user to access, view, and interact with web pages on the Internet or other network. For example, the user may enter a Uniform Resource Locator (URL) for a website through the browser; and the processor 320 may send a request for the website to an associated web server or servers 145 (illustrated in FIG. 1) of the website through the network 100. In response the web server 145 may deliver the data signals (e.g., HTML-formatted data) to the computer device 110. The web browser translates the data signals to a suitable output of the website on the monitor 350. The memory element 330 of the computer device may store data associated to a particular website that may be either accessed by a web server 145 and/or the processor 320 of the computer device during the interaction between the computer device 110 and the web server 145. While the computer device may be a conventional personal computer or network workstation, the computer device may be embodiment by any device capable of accessing and interacting with the web service, such as most Internet accessible devices (e.g., mobile devices).

Referring back to FIG. 1, one or more data centers 130 may provide a platform for receiving, managing and/or distributing information or communications, including gateway functions, such as code and protocol conversions, for example, between portions of network 100 and between the communications devices 110, 120, 140, and 150, and between network 100 and different networks. Data centers 130 may be implemented using any one or a combination of hardware, software, and/or firmware. For example, the data center 130 may be implemented using a plurality of general purpose computers, communications switching equipment, communications reception/transmission equipment and/or other communications equipment, all of which are well known. Although the data centers 130 are shown with direct connections to the network 100, any number and type of network elements may be interposed between a data center 130 and the network 100 (e.g., other data centers). Also, although the different elements of the illustrated data centers 130 are shown co-located, it should be understood that the different elements of data centers 130 may be remotely located from each other and different elements of the data center 130 may be connected to each other through the network 100. Data centers 130 may be managed by the network provider or may be managed by the media provider (where the media provider and network provider are separate entities).

In addition to the media content platforms 160, the data center 130 may also include other components. Some data centers 130 may include one or more of an account information platform 170, a single sign-on ("SSO") platform 180, web sever 145, web content platform 155 and DVR scheduling facility 135. The account information platform 170 may store account information for one or more of the users of the communication devices 110, 120, 140, 150. The account information platform 170 may include or otherwise be in communication with at least one memory element for storing the information (e.g., a database) and a processor for processing the information, including in response to a request or instructions received from users or other data center 130 components. In general, an account includes information and/or instructions pertaining to a particular user. The SSO platform may be configured to authenticate and approve access to information stored within the account information server 170 or other information stored in additional servers of the data center 130. In particular, the user may access his account on the account information platform 170 by logging on through the SSO platform 180 by using one of the communication devices 110, 120, 140, 150. For example, the user may be able to log on through a web page provided to a communication device 110.

The web server 145 may provide a facility for communication between communications devices and data centers 130 over network 100 using, for example, Hypertext Transfer Protocol (HTTP), as is well known. Web server 145 may be in communication with Web Content Platform 155, which may store/provide content which is accessible over network 100 via web server 145. Examples of content that may be stored/provided by web content platform 155 are HTML documents ("pages"), still images, video, audio, executable applications (e.g., applets), and other content commonly available via "web" access. Some data centers 130 may also include DVR facilities (not shown) that can provide a network-based DVR facility available to users. Some data centers 130 may also include IPG facilities 165 that can provide IPGs or portions thereof, for example, to set top boxes 120 over network 100.

The DVR scheduling facility 135 may be configured to facilitate communications and commands between a user communication device and a set top box 120 having a DVR facility, or other DVR equipment. For example, a user may be able to send recording and other commands to his or her set top box 120 from a computer device 110 or mobile device 150. The DVR scheduling facility 135 may also be configured to send information regarding a set top box 120 to a computer device 110 or mobile device 150 of the user. For example, while in communication with other elements of the data center, the DVR scheduling facility 135 may send program guide information to the computer device 110.

As a more specific example, the DVR scheduling facility 135 may provide or be accessible through a web page that includes one or more advertisements for a particular media program, referred to herein as web advertisements. The advertisement may be in the form of a text link or a combination of an image and text link such as a pop-up ad, a banner ad (live or traditional), or a hover ad. The advertisement may include an image that includes a message such as "add to my DVR recording" or another message to encourage the user to click on the advertisement. The associated link of the advertisement represents a command or request. The command or request may be to record the media program that is the subject of the advertisement on the set top box of a user selecting the command. The command or request may be to retrieve additional information about the media program. Or the command or request may be to provide recording or other options regarding the media program, such as program guide information, e.g., times and channels that are airing the media program.

In response to a request, the DVR scheduling facility 135 may send program guide information regarding the media program of the web advertisement. The program guide information may be based on the identity of the user. Specifically, the DVR scheduling facility 135 may determine or retrieve user specific program guide information for the media program based on the channels and programming available to the user. For example, the DVR scheduling facility 135 may access such information on the account information platform 170 or through the media content platforms 160 or the set top box 120 of the user in the form of the customer-specific IPG for that user.

The DVR scheduling facility 135 may deliver information to the user through one or more web pages. For example, the information may be delivered through the original web page with the web advertisement and be in a form of an interactive-expandable banner. Alternatively, the user may be redirected to a second web page to view the information. Moreover, the user may be redirected to multiple web pages as he or she reviews and selects the information provided. According to an embodiment, the information may be presented similar to the IPG available through the set top box, which is a format that the user may be familiar with.

The user may be able to send a request to record a particular showing of the media program by selecting the showing through the user input device 340 of the computer device. As examples, the request may be sent by clicking or selecting on an icon or link on the web page or by entering a particular channel and time range or as code listed in the advertisement for the media program. The DVR scheduling facility 135 may receive the request and send the request to the associated set top box 120 of the user. The set top box 120 may receive the request and store the request for future execution. The set top box 120 may send a confirmation of an acceptance of the request to the DVR scheduling facility 135. In some instances, the set top box 120 may send a notice of conflict of the request to the DVR scheduling facility 135. For example, the recording of the media program may conflict with another recording command.

The DVR scheduling facility 135 may receive the acceptance or notice of conflict and send that information to the user through one or more web pages. For the notice of conflicts, the user may be able to send additional requests or commands to resolve the conflict. For example, the user may request that the recording request of the media program take priority over other recording commands.

Although the DVR scheduling facility 135 has been generally described as the hardware component of the data center that is directly communicating with the user through web pages and to the set top box 120, it is understood that the functions described herein for the DVR scheduling facility 135 may be shared or performed by other hardware components or elements of the data center or the network in other embodiments (e.g. web server 145). Moreover, it is understood that in some embodiments one or more intermediate components may exist between the DVR scheduling facility 135, the set top box 120, and the communication device of the user. Therefore, it is understood that the communication between the DVR scheduling facility 135, the set top box 120, and the user communication device may be through one or more intermediate components and in instances where the DVR scheduling facility 135 is described herein as sending information to the set top box 120 or to the computer devices 110, the information may be sent through one or more of these intermediate components.

As is well known, one or more the operations or functions described herein may be combined and performed through software or a combination of software or hardware. As an example, in some embodiments a computer program product stored on a computer-readable storage medium (e.g., software) comprising of one or more executable portions may perform the operations or functions described above. Additionally, the DVR scheduling facility may comprise one or more interconnected systems providing load balancing, fault-tolerance and inter-system interfacing. For example, in some embodiments, DVR scheduling facility 135 may include subsystems for interfacing with web server 145, account information platform 170, network-based DVR facilities and IPG facility 165.

Figure 4:
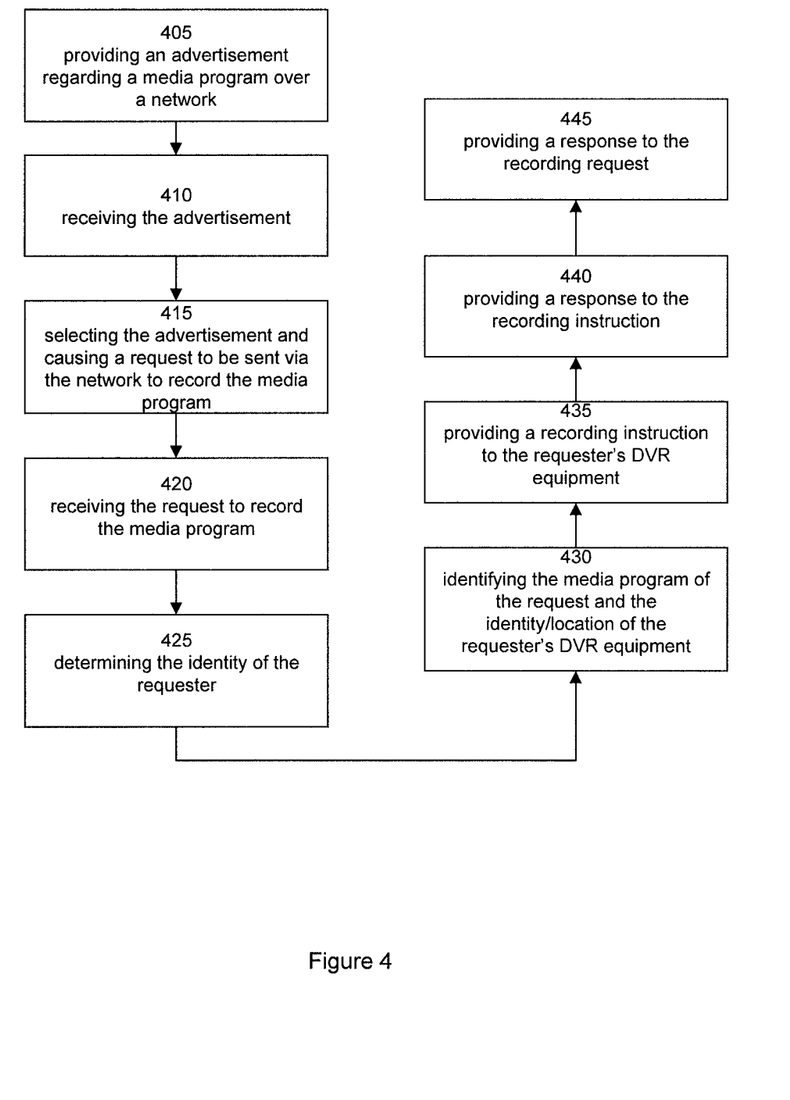
FIG. 4 is a flow chart illustration of a method according to an exemplary embodiment.

FIG. 4 illustrates a method consistent with an exemplary embodiment. An advertisement is provided over network 100 (step 405). The advertisement may be, for example, a web-based advertisement that is associated with a media program "The Cop Show". The content for the advertisement may be stored, for example, in a web content platform 155 of a data center 130 and delivered through a web server 145. The advertisement may include one or more associated links. The advertisement may be received by a user at a user's communication device, such as a computing device 110 (step 410). The user may cause the computing device to select the advertisement and thereby cause a request to be sent over network 100 via one of the one or more associated links to one or more of the web servers 145 (step 415). The request may be a request for information regarding the media program, or a request to schedule recording of the media program by the user's DVR equipment. Upon receiving the request (step 420), the web server 145 may provide the request to a DVR scheduling facility 135.

The DVR scheduling facility 135 may then determine the identity of the requester (step 425). For example, the identity of the requester might be determinable based on the information provided in the request (e.g., source address, account number, user identifier). In some embodiments the identity of the user may be determinable automatically from the sending device (e.g., stored "cookies"). In some embodiments, the determination of the identity of the user may include sending a request for sign-in data and receiving the sign-in data. For example, a first time or unidentified user may be asked to register and sign-in. Registration and sign-in may including providing a user id and password or setting up an account. The user identification may be facilitated by the SSO platform 180 and the account information platform 170 to authenticate a user or to determine whether the user has a pre-existing account, and obtain information associated with the user to facilitate the DVR scheduling service, such as a network identifier for the user's DVR equipment and geographic/network information which may be useful in determining the location of media programming in network 100. The DVR scheduling facility may then use the information in the request and the user information to identify a media program which the user wants to record, and the identity/location of the user's DVR equipment (step 430). For example, the DVR scheduling facility 135 can use a users' geographic/network information to obtain program guide information associated with video services provided by the network provider, which may be correlated with information in the request identifying the desired media program (e.g., its title). In some embodiments the request may include program guide coding, which may permit more accurate correlation with program guide information available to the user. The DVR equipment associated with the user may be identified, for example, in (or via) the account information platform 170, and may include one or more DVR facilities associated with the user (e.g., one or more set top boxes with DVR facilities, one or more network-based DVR facilities). The user's DVR equipment may be identified by various identifiers, such as a network address (e.g., IP address), unique equipment identifier (e.g., MAC address, serial number) or other identifier associated with the equipment (e.g., a URI). Where more than one DVR facility is available to the user, preference information may be stored in order to determine the user's preferred DVR facility for recording.

The DVR scheduling facility 135 may then provide a recording instruction to the user's DVR equipment in order to schedule the recording of the desired media program (step 435). The recording instruction may include program guide information associated with the media program, such that the DVR equipment can identify the desired media program, as well as other information indicating that a recording operation is desired. The DVR equipment may provide a response to the DVR scheduling facility (step 440). The response may indicate that the recording was successfully scheduled. The response may also indicate that the recording was not successfully scheduled, and may indicate a reason for the failure (e.g., a conflicting recording). The DVR equipment may also provide no response (e.g., if the DVR equipment is disabled, disconnected, or otherwise unable to respond). The DVR scheduling facility may be configured to determine whether a response has been received from the DVR equipment, for example, within a certain "time out" period. In some embodiments, the DVR scheduling facility 135 may be configured to retry the message upon time out, or attempt the message to alternate DVR facilities of the user's DVR equipment (e.g. a different set top box, a network-based DVR facility, etc.).

The DVR scheduling facility may provide a response to the user's scheduling request (step 445). For example, the DVR scheduling facility may provide an indication that the recording request was successfully scheduled, or that the recording request was unsuccessful, and may further include reasons for the failure (e.g., recording conflict, DVR equipment not responding, etc.) The DVR scheduling facility may provide the response through various means, such as through the web page originally presented to the user, or through a message sent through another communications path to the user (e.g., email, text message, voice message, etc.).

The following describes further features and implementation examples.

The advertisement as described above may include audio and/or visual elements, as well as one or more URLs as links which, when a user selection of the advertisement (or a portion of the advertisement) occurs, cause a request to be sent to the specified URL. In some embodiments, the advertisement may include an indication of the ability for the user to schedule the recording of the media program by the user's DVR equipment. The indication may take the form of explicit text (e.g., "Click here to record to your DVR"), an image, or other detectible indication. In some embodiments, the indication may be deferred to later interaction with the user, or omitted (for example, where the user's intent to schedule recording can be inferred).

Figure 5:
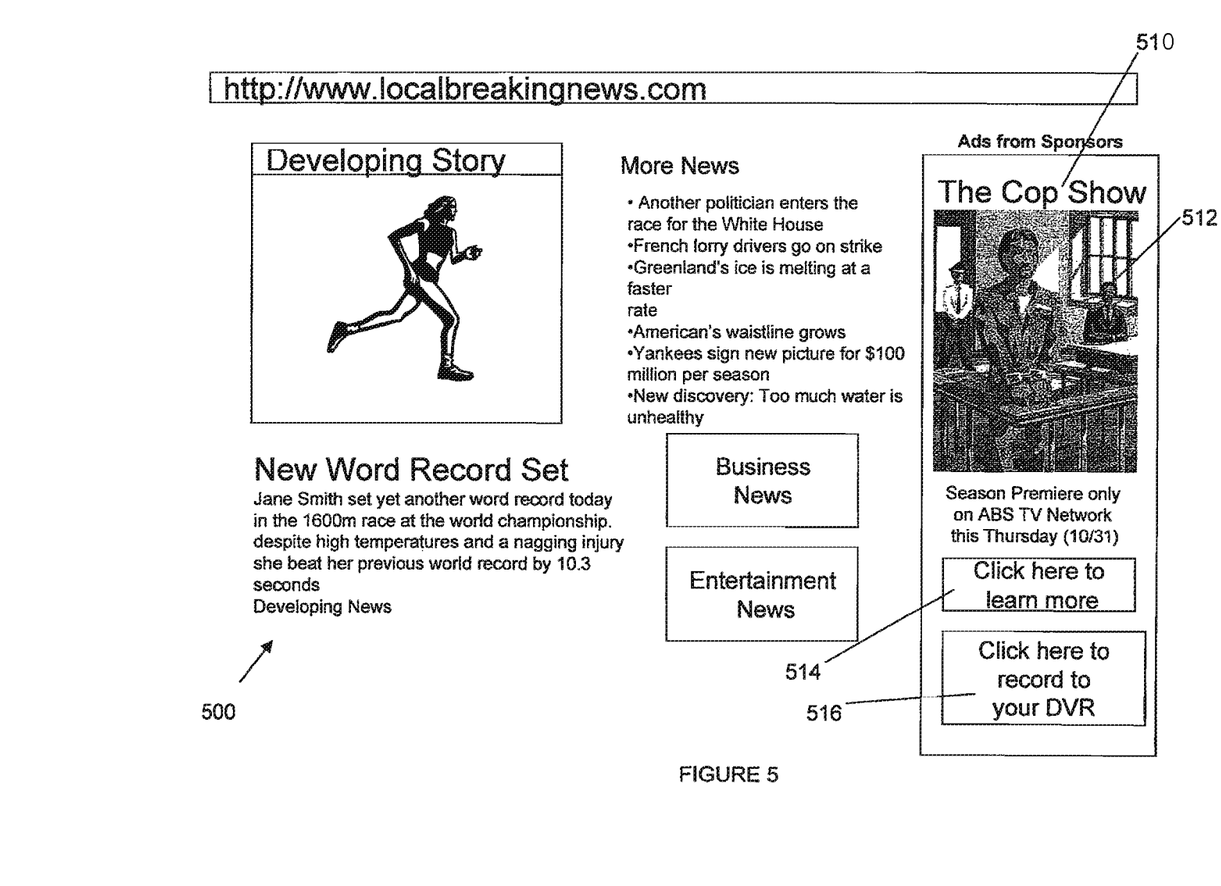
FIG. 5 is an illustration of a website consistent with an exemplary embodiment.

FIG. 5 shows one example of a possible advertisement implementation. In this example, the advertisement 510 appears on a web site 500 accessible through a computer device of a user. According to this example, the advertisement 510 includes a large portion 512 of the advertisement for illustrating an ad for a media program and an indication 514 for recording the media program. The example of FIG. 5 also includes a second indication 516 for learning more about the media program. In the present example, each indication 512, 514 is a text box that represents a URL. By selecting or clicking on an indication 512, 514, the user may cause his or her computer to access another website at the URL represented by the indication. For example, the indication that the user can learn more information about the media program may represent a URL which is used to access a website associated with the advertisement itself (e.g., a web site devoted to the media program). The text box indicating the user can record the media program may represent a URL which is used to cause the DVR scheduling facility to be accessed such that when the text box is selected by the user, the user's computing devices sends an appropriate request to the associated URL to record the media program.

Figure 6:
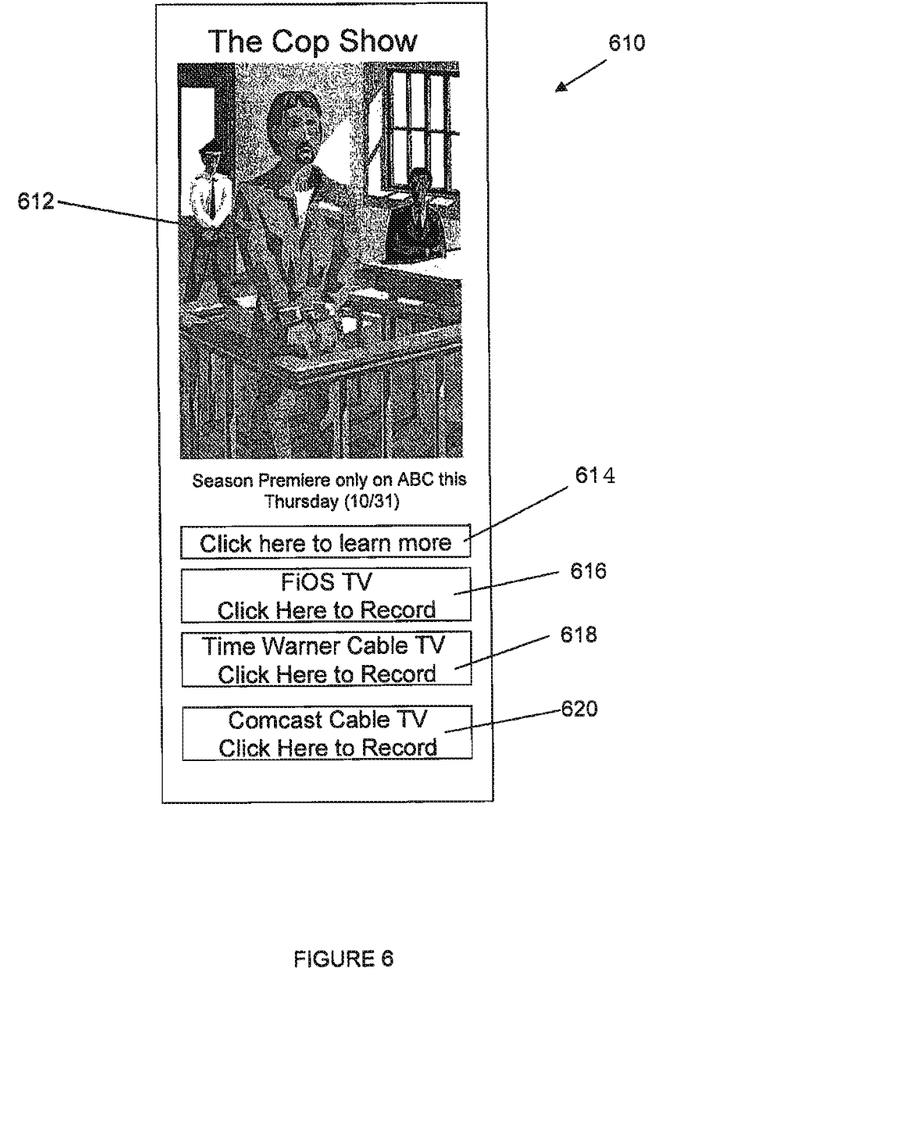
FIG. 6 is an illustration of an advertisement consistent with an exemplary embodiment.

FIG. 6 shows another example of a possible advertisement implementation. In this example, a large portion 612 of the advertisement 610 illustrates an ad for the media program. In this example, the advertisement 610 includes an indication 614 to learn more about the media program. The indication 614 may represent a URL associated with a web site about the advertisement itself (e.g., a web site devoted to the media program). The advertisement may also provided a plurality of indications 616, 618, 620 for DVR recording, where each recording indication 616, 618, 620 is associated with a particular service provider (e.g., a particular cable or telephone company). The URLs are associated with each of the indications 616, 618, 620 such that when one of the indications 616, 618, 620 is selected by the user, the user's computing devices sends an appropriate request to the associated URL. As another example, instead of or in addition to having recording indications for particular service provider, an advertisement may have recording indications for particular network providers.

Although the indications in the examples of FIGS. 5 and 6 are represented as text boxes, an indication may be any visual or audio element of the advertisement that represents a particular URL for sending requests or accessing another website. As another example, each large portion 512, 612 of the advertisements of FIG. 5 and FIG. 6 may be an indication. The indication may represent a URL which is used to access a web site associated with the advertisement itself (e.g., a web site devoted to the media program) such that if a user selects or clicks anywhere on the advertisement (other than any other indication, such as the recording indications 514, 616, 618, 620) the user's computer device may access the web site associated with the advertisement itself.

Where a URL is associated with directly causing a request for recording (e.g., as shown in FIGS. 5 and 6 with respect to indications 514, 616, 618, 620), the URL may include parameters to be provided to the DVR scheduling facility indicating information associated with the recording request. For example, the parameters may include identifiers associated with the media program (e.g., a title, program guide code, and/or date/time information), the network provider (e.g., a business/service name), and/or the identity of the user (e.g., subscriber identifier, equipment identifier).

In some embodiments, the recording parameters may be provided indirectly as a result of the transmission of the recording request to the URL. For example, a web server 145 associated with the URL may determine appropriate parameters based on information such as the URL itself and/or subscriber information (e.g., subscriber identifiers) obtained by the web server. The web server may then provide these recording parameters to the DVR scheduling facility.

Figure 7:
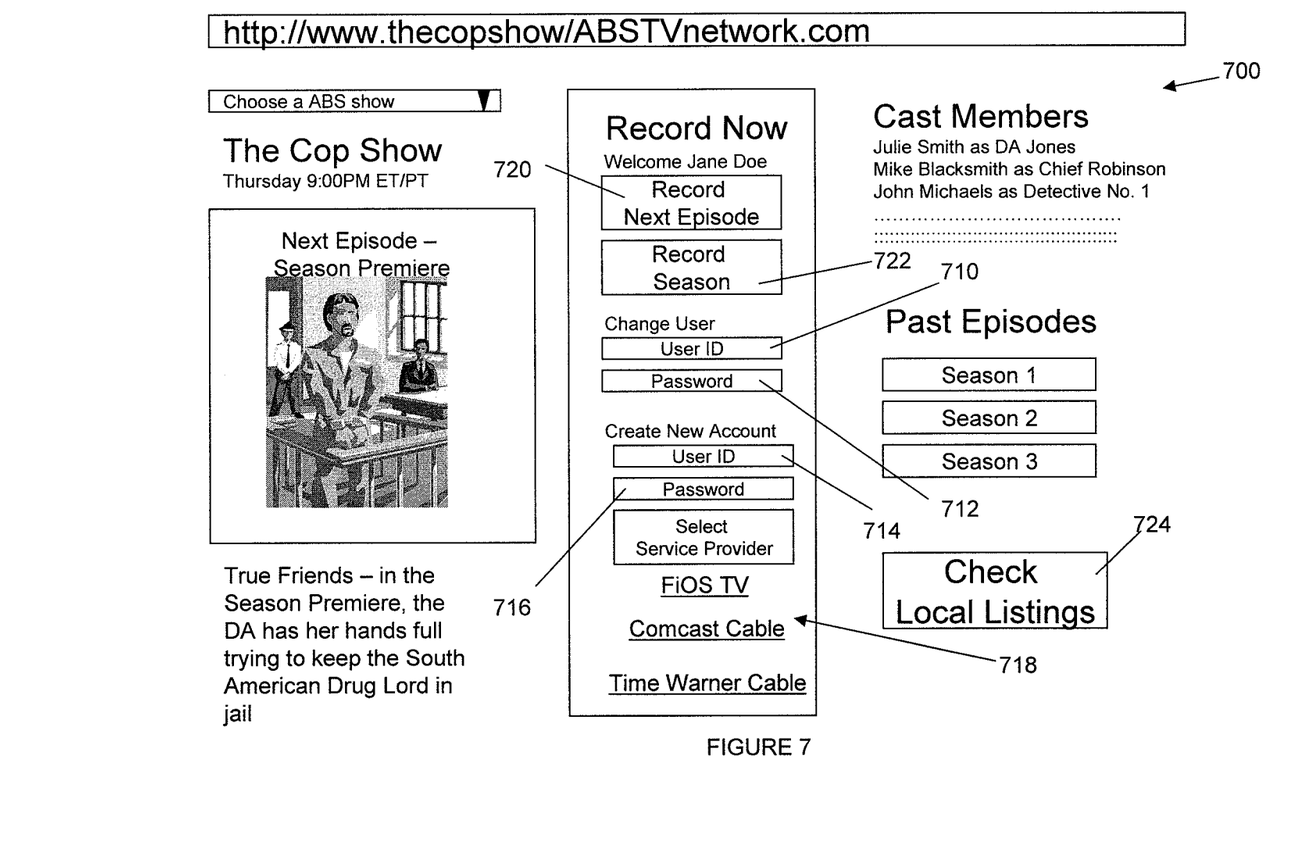
FIG. 7 is an illustration of another website consistent with an exemplary embodiment.

In the instances that the user accesses a website associated with the advertisement itself, such as a website about the media program, the user may be presented with options to record the media program from that website. For example and as illustrated in FIG. 7, a website 700 about the media program may include one or more DVR recording options for the user. The identity of the user may be determined based on the information provided automatically from the sending device (e.g., stored "cookies"). The determination of the identity of the user may include sending a request for sign-in data and receiving the sign-in data. For example and as illustrated, the user may be able to sign-in with his or her user id and password 710, 712. For a first time user or user without a pre-existing account, the web site may provide the option of setting up or creating an account. Creating an account may include providing a user id 714 and password 716 and indicating the user's service provider 718. Selecting the service provider may be used to help send the user's request to the appropriate DVR scheduling facility. Although not illustrated, in some embodiments, the user may be asked for more information that can be used to identify the appropriate DVR scheduling facility and/or DVR equipment of the user. The information may include the geographic location of the user or user's DVR equipment, the service provider's account number for the user, and identifier of the service provider's DVR scheduling facility. In addition to providing options for identifying the user, the website 700 may provide one than recording options 720, 722. For example, the user may be able to click on an indication 720 for recording the next episode or an indication 722 for recording a season of the media program. Each indication may represent a URL, such that by clicking on one of the indications 720, 722 a recording request is sent to a DVR scheduling facility. The URL represented by each indication may be based on, among other things, the identity of the user.

Figure 8:
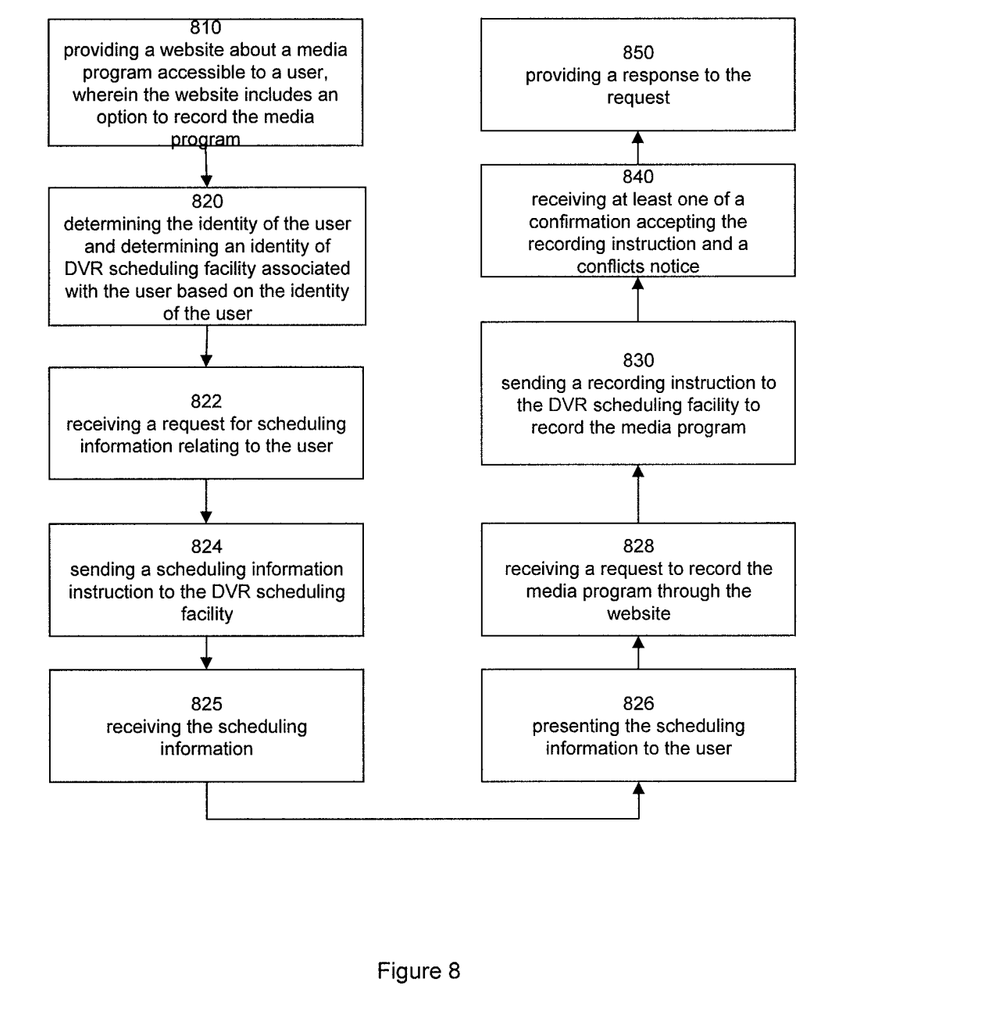
FIG. 8 is a flow chart illustration of a method according to an exemplary embodiment.

FIG. 8 illustrates a method consistent with an exemplary embodiment. The method may include providing a website about a media program accessible to a user, wherein the website includes an option to record the media program (step 810). In some instances, the recording options may be partially dependent on the identity of the user and the identity of a DVR scheduling facility associated with the user. Therefore, in some embodiments, the method may include determining the identity of the user and determining an identity of DVR scheduling facility associated with the user based on the identity of the user (step 820). For example and as described above, the determination may include requesting and receiving information from the user. As a more specific example, the determination operation may include sending a request for a service provider associated with the user and receiving a response regarding the service provided associated with the user. The user may request a recording of the media program by selecting a recording option (step 825). The method further includes sending a recording instruction based on the request to a DVR scheduling facility in communication with at least one DVR facility associated with the user to record the media program (step 830). The user may be provided with a response to the request (step 840). For example, the method may further including receiving at least one of a confirmation accepting the recording instruction and a conflicts notice wherein the response includes the at least one of the confirmation accepting the recording instruction and the conflicts notice (step 850).

In some embodiments, the provider of the web advertisement, the provider of the media program and the network provider may be separate entities. In such cases, each entity may provide communications to each other, for example, through web servers 145 associated with such entity that may be attached to network 100. For example, the provider of the web advertisement may provide links in the advertisement that cause a user selecting the advertisement's DVR recording feature to send the recording request first to the web advertisement provider (e.g., so that the web advertisement provider can record metrics according to its business model/arrangement). The web advertisement provider may then send a message to the media program provider indicating the selection by the user, allowing the media program provider to record metrics and/or provide its own web pages to the user. The media program provider can send a message to the network provider indicating the request to record the media program. Alternatively, the web advertisement provider could send the recording message directly to the network provider. Alterations of the process described above may be made as appropriate with different entities/roles/business needs, as should be clear.

Figure 9:
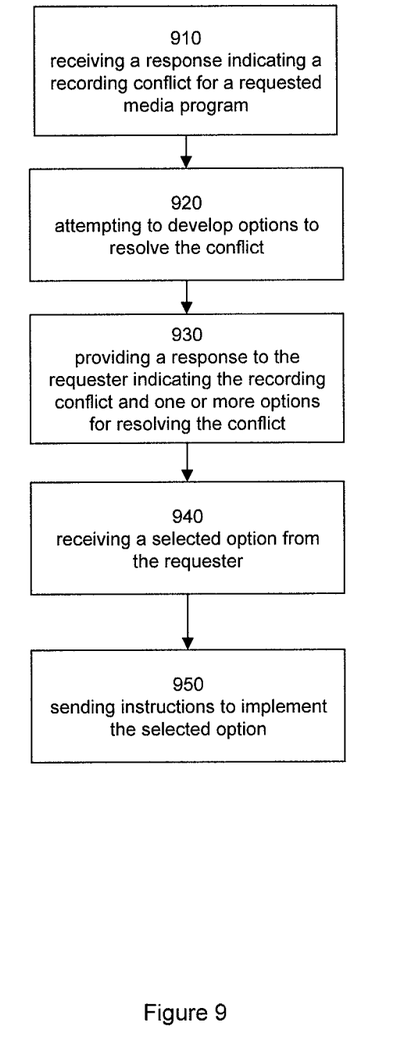
FIG. 9 is a flow chart illustration of a method according to another exemplary embodiment.

The DVR scheduling facility 135 may also include a facility to resolve recording conflicts. FIG. 9 illustrates an exemplary method implementing a conflict resolution facility. As noted above with respect to FIG. 4, the DVR equipment may provide a response to the DVR scheduling facility that indicates a recording conflict exists for the requested media program (step 910). This response may include information related to the conflict, such as identification of the requested media program, identification of the conflicting media program, and/or the conflicting time/date. The DVR scheduling facility may then attempt to develop options to resolve the conflict (step 920). For example, the DVR scheduling facility may search for alternate times/dates when the requested media program is being shown. The DVR scheduling facility may also search for alternate times/dates when the previously scheduled media program recording is being shown. The DVR scheduling facility may also determine if the media program is or will be available on an "on-demand" basis. The DVR scheduling facility may also determine if there are alternate DVR facilities within the user's associated DVR equipment which may be used for recording. For example, the network provider may provide a network-based DVR facility which users may use for recordings on a regular or limited basis (for example, on a per use or subscription basis).

The DVR scheduling facility may provide a response to the user indicating the recording conflict (step 930). The message may include some or all of the information related to the conflict, and may be presented in a form understandable to the user. For example, program guide codes may be converted into media program titles, time/date coding may be converted into convention time and date text. The message may be delivered through various means, such as email, text message, voice message, and web page. The message may include additional information related to resolving the conflict, such the options developed by the DVR scheduling facility. For example, the message may include options for scheduling the requested media program, options for rescheduling the previously scheduled media program recording, options for recording the media program at a network-based DVR facility, or options for obtaining the requested media program via an "on demand" service. The user may be able to send a message to the DVR scheduling facility selecting one of the presented options (step 940). For example, the message may includes URLs, email addresses, phone numbers or other addressing that is associated with some or all of the presented options, and by sending a message to the provided addressing, the user can indicate the selection of the option.

On receipt of the selected option, the DVR scheduling facility can take appropriate action to resolve the conflict (step 950), For example, the DVR scheduling facility can instruct the user's DVR equipment to record the requested media program at an alternate date/time, the reschedule the recording of the previously scheduled media program to an alternate date/time, to record the media program at an alternate DVR facility associated with the user, or to obtain (or to schedule the obtaining of) the media program through an "on demand" service. The DVR equipment may provide the DVR scheduling facility with a response to such instruction, and the DVR scheduling facility may then provide a response message to the user.

In some embodiments, a reminder message may be sent to the user, indicating that the recording requested will be occurring soon. For example, a reminder may be a message sent to the user at a predetermined time before or approximately at the start of the media program being aired. The reminder may be sent to the television of the user through the set top box, to a web page, or through an email sent to an account of the user. The user may have the ability to configure the DVR scheduling facility to enable or disable the reminder message facility.

One or more of the operations described above may be combined and performed through hardware, software, or combination thereof, as is well known. Therefore, embodiments may take the form of hardware systems, software, or combinations thereof. As an example, embodiments may include a computer program product stored on a computer-readable storage medium (e.g., software) comprising of one or more executable portions for performing the operations described herein. As another example, one or more interconnected systems may perform one or more of the operations. In one embodiment, a single processor of a server may be configured to perform one or more of the operations associated with the DVR scheduling facility 135, web server 145 and/or account information platform 170, as is well known.

The processor of a set top box, a computing device, or of a server of the data center disclosed herein may be embodied in many well known ways. For example, a processor may be embodied as a coprocessor, a controller or various other processing means or devices including integrated circuits such as, for example, an application specific integrated circuit ("ASIC"), and can contain one or more individual processing units (cores). The memory elements described herein may be various well known memory structures including volatile and non-volatile memory structures. Any of the memory elements may be configured to store information, data, applications, instructions or the like for enabling the devices disclosed herein to carry out various functions in accordance with exemplary embodiments, such as by storing software that is executable by the processor to cause the various functions of the processor that are described herein to be performed. For example, a memory element could be configured to buffer input data for processing by a respective processor.

In the preceding specification, various embodiments have been described. It will, however, be evident that various modifications and changes may be made thereunto, and additional embodiments implemented, without departing from the broader scope of the invention as set forth in the claims that follow. The specification and drawings are accordingly to be regarded in an illustrative rather than restrictive sense.

That which is claimed:

1. A method comprising:
receiving, by a digital video recorder ("DVR") scheduling facility, a request to record a media program in response to a selection by a user of a link associated with one of a plurality of recording indications included in an advertisement displayed in association with a web page, the advertisement comprising at least one of a banner ad, a hover ad, and a pop-up ad, wherein each of the plurality of recording indications included in the advertisement is associated with a distinct service provider included in a plurality of television service providers and wherein the link selected by the user included in the advertisement also specifies a selection by the user of a particular television service provider included in the plurality of television service providers;
determining, by the DVR scheduling facility, an identity of the user;
determining, by the DVR scheduling facility based on the determined identity of the user and the selection by the user of the particular television service provider, an identity of DVR equipment located remotely from the DVR scheduling facility and associated with the user; and
sending, by the DVR scheduling facility in response to the determining of the identity of the DVR equipment, a recording instruction associated with the media program to the DVR equipment associated with the user.

2. The method according to claim 1, wherein the DVR equipment includes at least one of a set top box having a DVR facility associated with the user and a network-based DVR facility available to the user.

3. The method according to claim 1 further comprising receiving, by the DVR scheduling facility, a confirmation from the DVR equipment of an acceptance of the recording instruction.

4. The method according to claim 1 further comprising:
receiving, by the DVR scheduling facility, a notice of a recording conflict associated with the media program from the DVR equipment; and
attempting, by the DVR scheduling facility in response to receiving the notice, to resolve the recording conflict.

5. The method according to claim 1 wherein the determining of the identity of the user includes sending a request for sign-in data and receiving the sign-in data.

6. The method of claim 1, further comprising:
receiving, by the DVR scheduling facility, a response from the DVR equipment indicating that the recording instruction failed; and
providing, by the DVR scheduling facility, an indication to the user that the recording instruction failed.

7. The method of claim 6, further comprising:
sending, by the DVR scheduling facility in response to the response received from the DVR equipment indicating that the recording instruction failed, the recording instruction to an alternate DVR facility associated with the user.

8. The method of claim 1, wherein the link includes parameters indicating at least one of the identity of the user, an identifier associated with the media program, and an identity of a network provider.

9. The method of claim 1, further comprising:
determining, by the DVR scheduling facility, an identifier associated with the media program;
wherein the recording instruction includes the identifier associated with the media program.

10. The method of claim 9, wherein the determining of the identifier associated with the media program includes determining a location associated with the user and determining program guide information associated with the media program specific to the location associated with the user.

11. The method of claim 1, embodied as processor-executable instructions on at least one non-transitory computer readable medium.

12. The method of claim 1, further comprising providing, by the DVR scheduling facility, a response to the user that is indicative of a successful scheduling of a recording of the media program.

13. The method of claim 1, wherein the web page does not include a program guide.

14. A system comprising:
at least one digital video recorder ("DVR") facility associated with a user;
a DVR scheduling facility remotely located from the at least one DVR facility and communicatively connected to the at least one DVR facility via a network and configured to
receive a request to record a media program in response to a selection by a user of a link associated with one of a plurality of recording indications included in an advertisement displayed in association with a web page, the advertisement comprising at least one of a banner ad, a hover ad, and a pop-up ad, wherein each of the plurality of recording indications included in the advertisement is associated with a distinct service provider included in a plurality of television service providers and wherein the link selected by the user included in the advertisement also specifies a selection by the user of a particular television service provider included in the plurality of television service providers,
determine an identity of the user,
determine an identity of the at least one DVR facility associated with the user based on the determined identity of the user and the selection by the user of the particular television service provider, and
provide, in response to the determination of the identity of the at least one DVR facility, a recording instruction associated with the media program to the at least one DVR facility.

15. The system of claim 14, wherein the DVR scheduling facility is further configured to receive a confirmation from the at least one DVR facility of an acceptance of the recording instruction.

16. The system of claim 14, wherein the DVR scheduling facility is further configured to:

receive a notice of a recording conflict associated with the media program from the at least one DVR facility; and attempt to resolve the recording conflict in response to receiving the notice.

17. The system of claim 14, wherein the DVR scheduling facility is further configured to:

determine that the recording instruction failed; and provide an indication to the user that the recording has failed.

18. The system of claim 17, wherein the DVR scheduling facility is further configured to send the recording instruction to an alternate DVR facility associated with the user in response to determining that the recording instruction failed.

19. A method comprising:

receiving, by a digital video recorder ("DVR") scheduling facility by way of a webpage about a media program, a request to record the media program in response to a selection by a user of an option associated with one of a plurality of options displayed within the webpage to record the media program, wherein each of the plurality of recording indications displayed within the web page is associated with a distinct service provider included in a plurality of television service providers and wherein the option selected by the user also specifies a selection by the user of a particular television service provider included in the plurality of television service providers;

determining, by the DVR scheduling facility, an identity of the user based on user input provided by way of the webpage and identifying a user ID associated with the user and a password associated with the user;

determining, by the DVR scheduling facility based on the determined identity of the user and the selection by the user of the particular television service provider, an identity of DVR equipment located remotely from the DVR scheduling facility and associated with the user; and sending, by the DVR scheduling facility in response to the determining of the identity of the DVR equipment, a recording instruction associated with the media program to the DVR equipment associated with the user.

20. The method of claim 19 further comprising receiving, by the DVR scheduling facility from the DVR equipment, at least one of a confirmation accepting the recording instruction and a notice of a recording conflict associated with the media program.

* * * * *